United States Patent [19]

Jones

[11] 4,266,745

[45] May 12, 1981

[54] PIPE HANGER

[76] Inventor: Harold D. Jones, 724 Hickorywood Dr., Flushing, Mich. 48433

[21] Appl. No.: 96,908

[22] Filed: Nov. 23, 1979

[51] Int. Cl.³ ............................................. E21F 17/02
[52] U.S. Cl. .......................................... 248/58; 248/71
[58] Field of Search ................ 248/58, 74 R, 73, 317, 248/74 A, 74 B, 71, 62; 24/257 R, 73 SA

[56] References Cited

U.S. PATENT DOCUMENTS

| | | | |
|---|---|---|---|
| 501,439 | 7/1893 | Reznor | 24/73 SA |
| 1,529,881 | 3/1925 | Engle | 248/71 |
| 2,291,148 | 7/1942 | Carson | 248/58 |
| 2,319,832 | 5/1943 | Trochim | 248/71 |
| 2,752,017 | 6/1956 | Segil | 52/484 |
| 3,266,761 | 8/1966 | Walton et al. | 248/74 B X |
| 4,057,210 | 11/1977 | Wellman | 24/257 R X |

FOREIGN PATENT DOCUMENTS

82786  11/1953  Norway ....................................... 248/59

*Primary Examiner*—J. Franklin Foss
*Attorney, Agent, or Firm*—Harry R. Dumont

[57] ABSTRACT

A hanger for pipes particularly those of relatively large diameter and made of plastics or the like that cannot be hung directly on wires. The hanger includes a curved wire portion with a pair of upward pointed ends to be driven into a wood or other structural member. A strap portion is mounted on the wire portion to distribute the weight of the pipe.

4 Claims, 7 Drawing Figures

PIPE HANGER

BACKGROUND OF THE INVENTION

This invention relates to pipe hangers used by plumbers. According to most local codes pipes exceeding three inches or thereabouts in diameter must be hung and suspended on hangers which include straps. Direct mounting on wires cannot be done because of galling and wear effect which would be caused by the wire against the pipe surface.

A number of earlier devices include resilient covers of specialized shape for the wire. This type of construction is shown and described in E. J. Carson, U.S. Pat. No. 2,291,148 issued on July 28, 1942 for "Pipe Hanger". Additional prior art devices have been employed which include rather complex guide rollers and associated restraining devices for the rollers as they are mounted on the pipe hanger wire. J. B. Kirk, et al., U.S. Pat. No. 2,641,428 issued on June 9, 1953 for "Pipe Hanger With Glide Rollers" is representative of this type of device. Still further pipe hangers are known in which the pipe is retained on a wire with the wire including a strap integrally formed in a closed loop midway between the ends of the wire. Such a device is shown in E. A. Johnson, U.S. Pat. No. 2,681,197 issued on June 14, 1954 for "Pipe Support".

SUMMARY OF THE INVENTION

The present invention will be seen to include a simplified form of pipe hanger using conventional and readily available materials from the plumber's store such as wire and perforated or unperforated strap material. The present invention includes a device which can be fabricated to size from two basic materials of strap and wire and adjustably installed on the job. The device includes a perforated strap and a wire having the strap threaded on it.

BRIEF DESCRIPTION OF THE DRAWINGS

The present invention will be described in the accompanying specification with reference to the drawings in which like numerals are used to identify like parts and in which.

DETAILED DESCRIPTION OF THE PREFERRED EMBODIMENT

Figure 1:
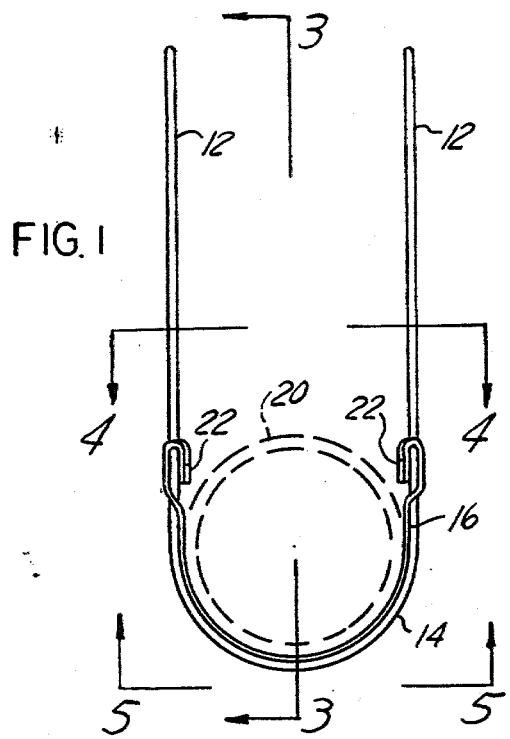
FIG. 1 is a front elevational view of the device.
Figure 2:
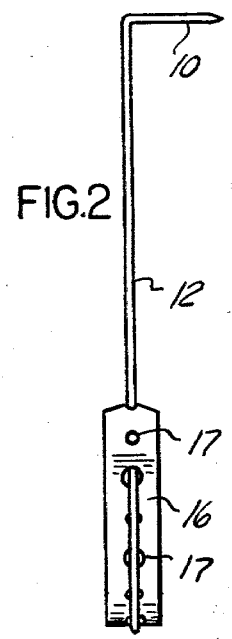
FIG. 2 is an outside elevational view of the device of FIG. 1.

As best shown in FIGS. 1 and 2, my invention includes a wire portion having a pair of upper pointed end portions 10, a pair of side portions 12 and a lower arcuate curved end portion 14. A strap 16 having a plurality of perforations 17 formed along its length is mounted on the lower end portion 14. In the mounting operation, the wires 12 are each passed through a different one of the openings 17 for holding the strap portion 16 in place. Because of the strap portion 16 being bendable and also because of the wire portions 12 being adjustably bendable, it is possible to form pipe hangers which will accomodate a broad range of sizes and weights of pipes 20. In each case, the strap 16 is tightly fastened and anchored to the associated wire portion 12 by crimped end portions 22 as shown in FIGS. 3 and 6.

Figure 3:
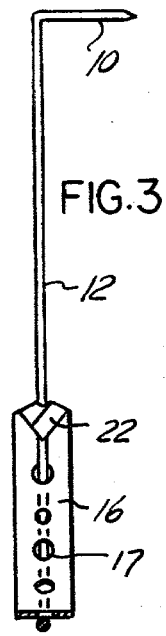
FIG. 3 is an inside side elevational view of the device with one side removed.
Figure 4:
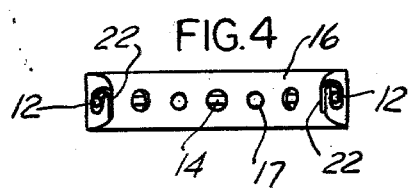
FIG. 4 is a fragmentary top plan view of the device in FIG. 1.
Figure 5:
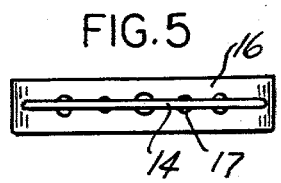
FIG. 5 is a bottom plan view of the device in FIG. 1.
Figure 6:
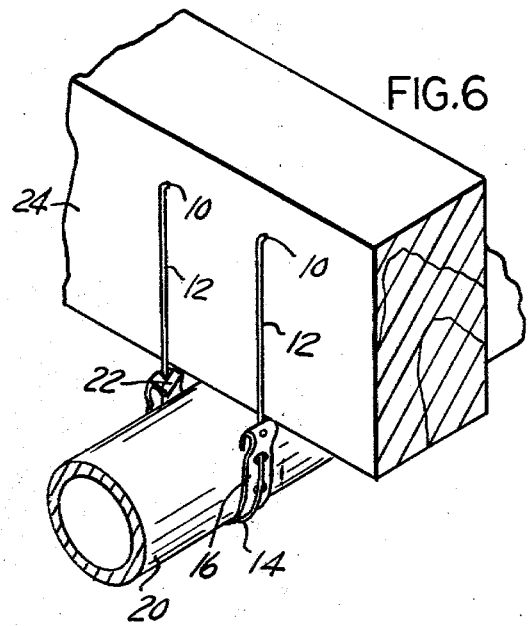
FIG. 6 is a perspective view of the device as it is installed on a structural member.

It will be noted that the crimped end portions 22 in FIG. 3 are outwardly oriented with respect to the bend portion 14 whereas in FIG. 6 the crimped end portions 22 are inwardly directed to thus operate as a limit to the upper movement or displacement of the pipe 20.

In typical installations of pipe on the site, it has been the practice to use straps such as strap 16 with nails or other fasteners being driven directly through its perforations into the structural member such as the plank 24 shown in FIG. 6. This causes a problem since it is necessary to cut each strap 16 to length and to maintain the loose parts in one's hand while the pipe hanger is being installed and adjusted for height and slope. The present invention uses readily available perforated strap and wire to install the pipe hanger in place with a minimum of effort.

FIG. 6 shows a typical installation in which pipe 20, strap 22 and wire portion 12 with pointed end portions 10 can be readily registered to the proper height or position and then the pointed end portions 10 can be driven into place with a single hammering operation.

Figure 7:
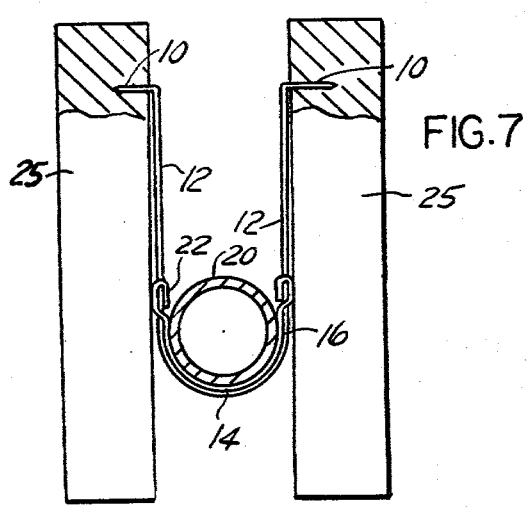
FIG. 7 is a partially sectional, front elevational view of a different embodiment of my invention.

FIG. 7 shows an alternate construction of my invention in which the wire side portions 12 have their pointed end portions 10 constructed so as to lie in a common plane. In this manner, the pipe hanger can be installed between adjacent but spaced frame structures 25 with a minimum of holding and alignment. Thus, as shown in FIG. 7, it is possible to mount the pipe hanger in relatively close quarters with a pair of hammering operations.

It will thus be seen that I have provided by my invention an improved pipe hanger of simplified construction formed from standard available parts.

I claim:

1. A pipe hanger for a relatively large size pipe, comprising:
    a bendable wire portion having a pair of pointed end portions for anchoring it into a structural element;
    an arcuate bend portion;
    a bendable strap having a plurality of spaced perforations over a substantial portion of its length;
    said strap having at least two of said perforations registered about said wire; and
    a pair of crimped end portions of said strap for holding it against slippage and in place on said wire portion.

2. The combination as set forth in claim 1 wherein said pointed end portions are formed orthagonal to the plane of said arcuate bend portion.

3. The combination as set forth in claim 1 wherein said pointed end portions lie in a common plane with said arcuate bend portion.

4. The combination as set forth in claim 1 wherein said strap comprises alternately larger and smaller openings, said wire portion threading it through opposed larger openings.

* * * * *